AUTOMATIC CALL RECORDING SYSTEM

Filed Oct. 1, 1964 2 Sheets-Sheet 1

INVENTOR
A.E. JOEL, JR.
BY William F. Simpson
ATTORNEY

Jan. 16, 1968 A. E. JOEL, JR 3,364,310

AUTOMATIC CALL RECORDING SYSTEM

Filed Oct. 1, 1964 2 Sheets-Sheet 2

3,364,310

AUTOMATIC CALL RECORDING SYSTEM

Amos E. Joel, Jr., South Orange, N.J., assignor to Bell Telephone Laboratories, Incorporated, New York, N.Y., a corporation of New York Filed Oct. 1, 1964, Ser. No. 400,790
7 Claims. (Cl. 179—7)

ABSTRACT OF THE DISCLOSURE

Automatic number identification is provided through the individual stations of a PBX by applying a signal through identifier relays to cause a common encoder to apply proper identification to a sender which transmits that identification to automatic message accounting equipment at a central office. In place of the normal station identification a separate charging code can be registered in response to dial signals from the station during a time delay period before the PBX trunk circuit to the central office is seized.

Figure 1:
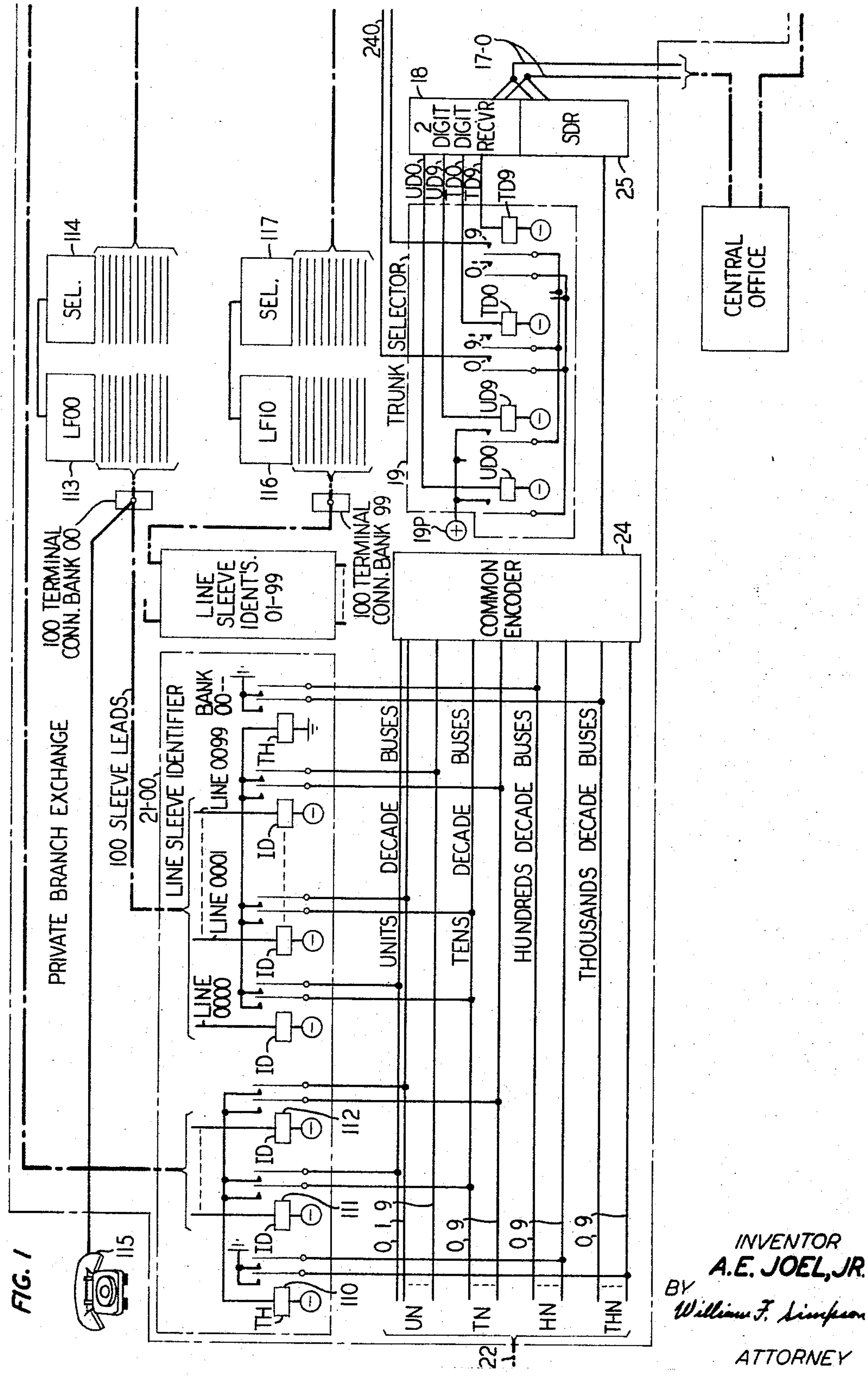

This invention relates to automatic communication switching systems and, more particularly, to automatic message accounting arrangements in communication switching systems.

The introduction of extended range dialing has in recent years increased both the flexibility and efficiency of a communication switching network to the extent that at present or in the very near future direct distance dialing will be widely accepted and almost universally employed in this country.

However, in order to permit the introduction and extension of the direct distance dialing features first to adjacent cities and then on a country or nationwide basis, it has been necessary to develop an automatic accounting arrangement so that the charges for the service could be billed to the subscribers making use of it.

The automatic accounting equipment was first applied to certain local central offices and then later extended to tandem offices.

Initially the automatic message accounting equipment identified the calling subscriber and then assessed the charges against this subscriber's station or line. In order to accomplish this the subscriber's line or station was identified and then his directory number determined after which the directory number of the calling and called stations and length of the communication were all recorded and then these recordings employed to compute the charge for the call and charge the calling subscriber.

Initially calls from PBX stations were billed against the PBX directory number. Thus, in order to prevent unauthorized use of the service from PBX's and to properly assess the charges to the proper accounts of the PBX user, a PBX operator was necessary to intervene between a PBX subscriber station and the central office or toll or direct distance dialing equipment.

In order to overcome these difficulties, PBX station identifying equipment has been developed and the central office and recording equipment modified so that the PBX station number may be recorded for charging purposes intsead of the PBX directory number.

As a result many PBX subscribers are willing to permit at least a group of their stations to directly dial into the direct distance dialing networks. Such identifying and recording arrangements are described in U.S. Patent 3,062,918, granted to O. H. Williford on Nov. 6, 1962.

However, prior to the development and introduction of this advanced automatic message accounting, the PBX subscribers developed a practice of having certain calls charged to the respective PBX stations and other calls directed perhaps to the PBX directory number and still other calls were charged against predetermined and selected account numbers. This arrangement greatly facilitated the checking and supervision of the calls from the PBX and aided the PBX customer in properly allocating the charge of the PBX service to different accounts.

An object of my invention is to provide switching equipment under control of one or more PBX subscriber's stations for substituting an accounting number or other number or code including the PBX directory number for the PBX station number in the automatic call identifying equipment.

A feature of my invention relates to switching equipment which permits a PBX subscriber to selectively substitute one of a plurality of group codes or account numbers for his individual station number for charging purposes.

Another feature of my invention relates to an automatic switching circuit controlled by one or more extra digits transmitted from the PBX subscriber's station for selecting any one of a plurality of substitute codes or charging numbers for the calling PBX station number to which the call may be assessed.

Still another feature of my invention relates to automatic switching means to enable a calling subscriber to select an identifying code identifying the call rather than the calling subscriber which code may be employed for assessing the charges for the call.

In accordance with a specific embodiment of my invention an additional switching circuit is interposed between the selector and the outgoing trunk from the PBX such as shown in FIG. 1 of the above-identified patent to Williford. This auxiliary switching circuit provides a delay interval during which the PBX subscriber may dial an additional charging digit to select one of a plurality of codes or numbers to which the charge for the call may be assessed instead of the PBX subscriber's station or directory number. The auxiliary circuit responds to dial pulses and selects an additional identifying relay and TH relay such as shown in FIG. 1 of the above-identified patent to Williford. Thereafter, the PBX subscriber will receive dial tone a second time and then dial the called subscriber's stations including the office code and area codes where appropriate. Later when the central office equipment to which the trunk is connected checks to assess the charges for the call, it will cause the calling subscriber's line to be identified in a manner described in the above-identified Williford patent. In this case, however, a different ID and TH relay will be operated so that the charges for the call will be assessed against a different code or number selected by the calling PBX subscriber. This number will be recorded in the automatic message accounting equipment and cause the charges to be assessed against this number in the usual manner.

Figure 2:
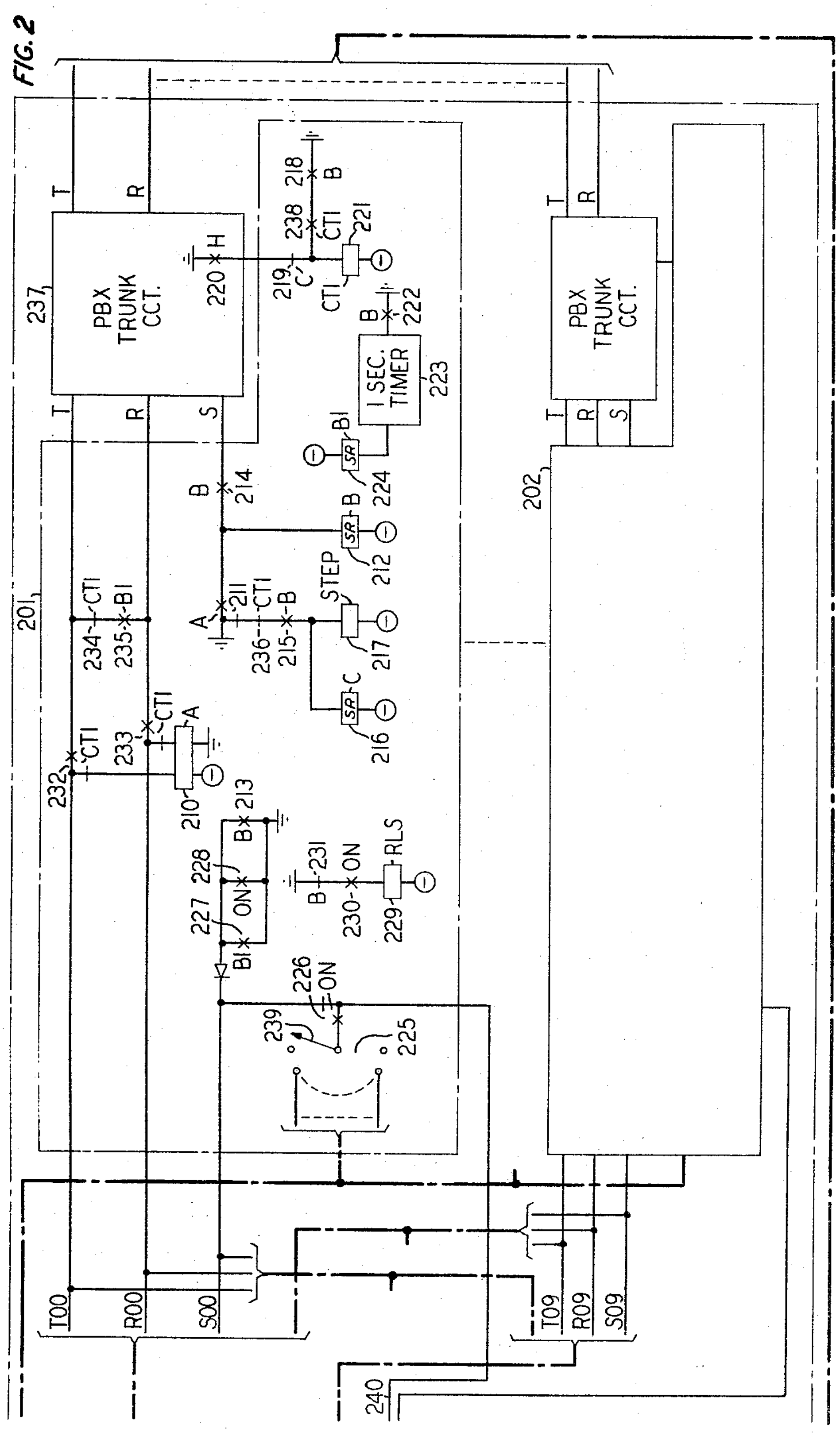

The foregoing objects and features of my invention may be more readily understood from the following description of an exemplary embodiment thereof when read with reference to the attached drawing, in which:

FIG. 1 is similar to FIG. 1 of the above-identified Williford patent showing the modifications thereof in accordance with my invention; and FIG. 2 shows the circuit details of the auxiliary switching equipment which responds to dial pulses in an exemplary embodiment of my invention and selects one of a plurality of charging or accounting codes or numbers to assess the charges for a call.

FIGS. 2 and 3 of the above-identified Williford patent illustrate a suitable central office or switching system which cooperates without change with the circuits of FIGS. 1 and 2 attached hereto and therefore have not been repeated or duplicated herein. They nevertheless are provided and cooperate with the circuits of FIGS. 1 and 2 showing the exemplary embodiment of my invention in the manner described in Patent 3,062,918.

While the specific embodiment of my invention described herein is arranged to cooperate with the arrangement shown in Patent 3,062,918, my invention will cooperate equally well with other automatic accounting and other automatic identifying arrangements.

When a PBX subscriber such as for example station 115 initiates a call, a line finder in the line finder group to which this subscriber's station is connected will be set into operation and find the calling station line 115. Assume, for example, that line finder 113 is set into operation and finds this line. Then upon finding the line the PBX dial tone will be returned from the interconnected selector 114 to the PBX station 115.

Assume further that this subscriber wishes to call a distant subscriber so the necessary digits will be dialed to select an outgoing trunk from the PBX to a central switching center. Usually a nine is the number dialed to select an outgoing trunk and as a result the selector 114 responds to this digit and is stepped up to the selected level and then selects an idle trunk on this level.

In accordance with the exemplary embodiment of my invention described herein, instead of selecting an outgoing trunk directly to the central office the selector selects an auxiliary trunk circuit 201 or 202 shown in FIG. 2 in accordance with my invention. This auxiliary trunk circuit provides a delay interval during which the subscriber at station 115 may dial an additional one or more charging digits to select an alternate code or number against which the charges for the call are to be assessed.

If the subscriber does not wish to dial an additional digit, then at the end of a predetermined interval dial tone will be received from the central office and the call continued in the manner described in Patent 3,062,918.

Upon the seizing of the auxiliary trunk circuit 201 of FIG. 2 the A relay 210 is operated over the tip and ring conductors T00 and R00 through the break contacts 232 and 233 of the CT1 relay 221 and then through the selector 114, line finder 113 to the closed loop circuit at the station circuit 115.

The operation of the A relay 210 closes contacts 211 which complete an obvious circuit for the operation of the slow release B relay 212. This relay in turn causes contacts 213 to close and apply ground to the sleeve S00 thus holding the line finder and selector or selectors and making this trunk and auxiliary trunk circuit busy so that it will not be selected by another selector for another call.

The operation of the B relay 212 causes contacts 222 to close and initiate the operation of a timer 223.

The timer 223 may be set to time and desired time interval of several seconds during which the subscriber at station 115 may dial a charging digit. As shown in the drawing, it is assumed that this timer will be set for a time interval of at least one second. The timer 223 may be of any suitable form including relays, tubes, transistors, etc.

If the subscriber does not dial an additional charging digit during this time interval, then at the end of the time interval the B1 relay 224 is operated which relay in turn causes contacts 235 to close and seize the outgoing PBX trunk circuit 237 to the distant central office. The PBX trunk circuit 237 in turn applies ground to the sleeve or S conductor which in turn completes a holding circuit for the B relay 212 from battery through the winding of this relay and its operated contacts 214 to the ground applied to the S conductor by the trunk circuit 237. In addition the trunk circuit 237 causes an H relay to operate in the usual manner and in turn close its contacts 220 which, in turn, completes a circuit for the operation of the CT1 relay 221 from battery through the winding of this relay, the break contacts 219 of the C relay 216 and the operated contacts 220 of the H relay to ground. The operation of the CT1 relay 221 completes a circuit for maintaining itself operated from ground through the operated contacts 218 of the B relay 212, the operated contacts 238 of the CT1 relay 221 and then through the winding of this relay to battery. The operation of the CT1 relay 221 causes the contacts 232, 233 and 234 to be operated with the result that the tip and ring conductors T and R from the trunk circuit 237 are extended to the first selector 114 and then through the line finder 113 to the subscriber's station 115. At this time the central office dial tone will be returned to this PBX station whereupon the subscriber will dial the called subscriber's station number including the office code and area code when desired in the usual manner. Thereafter, the various circuits operate in the manner described in the above-identified Patent 3,062,918 and cause the directory number of the subscriber's station 115 to be identified and employed to assess the charges for the call.

At the termination of the call ground will be removed from the S conductor by the trunk circuit 237 and thus permit the B relay 212 to release and in turn restore the timer 223 to normal and release the B1 relay 224. In addition, the trunk circuit will cause the H relay to release and open contacts 220 with the result that the CT1 relay 221 also releases and restores the auxiliary trunk circuit to its initial or idle condition.

Assume again that the subscriber at the PBX station 115 initiates a call to a distant station, and as a result, the A relay 210 and the B relay 212 operate in a manner described above and initiate the operation of the timer 223.

However, now assume that during the time interval of the timer 223 the PBX subscriber at the PBX station 115 dials an additional accounting or charging digit. As a result the A relay 210 follows the dial pulses and releases in response to the first of these pulses.

Upon the release of the A relay 210 break contacts 211 close and complete a circuit for the operation of the C relay 216 in parallel with the stepping magnet 217. These circuits extend from battery through the winding of the C relay 216 and the winding of the stepping magnet 217 in parallel and then through the operated contacts 215 of the B relay 212, the released contacts 236 of the CT1 relay 221 and the released contacts 211 of the A relay to ground. As a result the C relay operates and maintains its contacts operated during the remaining pulses of this extra accounting digit. The stepping magnet 217 operates and causes the switch arm 239 to advance from its normal position to its first position.

As a result the various off-normal contacts 226, 228, and 230 all close and remain closed or operated until the stepping switch is returned to its normal or idle condition at the end of the call.

The operation of the C relay 216 causes its contacts 219 to open and thus prevent the operation of the CT1 relay 221 during the dialing of this accounting digit.

At the end of the first pulse the A relay operates and operates its contacts 211 thus interrupting the above-described circuit for the C relay 216 and the stepping magnet 217. As described above, the C relay 216 remains operated while the stepping magnet releases. On each succeeding dial pulse the A relay releases and causes the stepping magnet 217 to take an additional step thus advancing the brush arms 239 an additional step. The C relay is maintained operated at this time.

As before, at the end of the time interval of the timer 223, the B1 relay 224 operates and causes contacts 235 to close and seize the trunk circuit 237. The trunk circuit responds as described above and applies ground to the S conductor through the operated contacts 224 of the B relay 212 thus providing the locking or holding circuit which maintains this B relay 212 operated. The trunk circuit also causes the H relay to operate and close the contacts 220 in a manner described above. However, closure of these contacts at this time is ineffective because the C relay 216 is operated and maintains its contacts 219 open until the end of the dialing of the accounting digit or digits.

If the accounting digit is completely dialed prior to the operation of the timer 223, then upon the final operation of the A relay 210 the C relay 216 will finally release and thereafter the circuits operate in substantially the same manner as described above except that the accounting switch 239 is now off-normal and causes a different identification code or digit to be obtained as will be described presently.

Alternatively, if the accounting digit has not been fully dialed and received by the time the timer 223 operates, then the operation of this timer causes the B1 relay 224 to operate and closes contacts 227, thus further maintaining the auxiliary trunk circuit 217 busy. In addition, the operation of the B1 relay 224 causes the contacts 235 to close and seize the trunk circuit 237. This trunk circuit responds and causes ground to be applied to the S conductor and through the B relay 212, contacts 214 to the winding of the B relay 212, thus providing a locking or holding path for maintaining this relay operated during the remainder of the call.

The trunk circuit 237 also responds and causes its H relay to operate and close the contacts 220. The operation of these contacts at this time however does not produce any further circuit action because the C relay contacts 219 are maintained open by the C relay 216 which is held operated by the dial pulses as described above. Then upon the completion of the receiving of this accounting digit the A relay will reoperate and remain operated, thus allowing the C relay 216 to release. Release of this relay causes its contacts 219 to close and complete the above-described circuit for the operation of the CT1 relay 221. This relay thereupon operates and closes its locking contacts 238 as well as the contacts 232, 233 and 234 which extend the T and R leads from the trunk circuit 237 through the selector 114, line finder 113 to the PBX subscriber's station circuit 115. As a result the dial tone returned from the central office over the trunk 237 is now transmitted to the subscriber's station 115 whereupon the subscriber will then complete the dialing of the call. These dial pulses are then transmitted over the trunk circuit 237 to the distant switching center where they cause the proper connections to be set up for establishing the desired communication paths between the subscriber's station 115 and the called subscriber's station.

Later when the identity of the calling subscriber's station 215 is to be determined, the central office equipment causes the trunk selector 19 to operate in the manner described in the above Williford patent, whereupon positive battery is applied to the conductor 240. At this time the off-normal contacts 226 are operated with the result that the path from the positive voltage source 19P of the trunk selector circuit 19 no longer extends over the S00 conductor and through the selector 114 and the line finder 113 to some one of the ID relays in the line sleeve identifier 21–00. Instead the conductor 240 is now interconnected with the stepping brush arm 239 and then over the selected conductor to one of the added accounting ID relays to negative battery. The thus-selected ID relay operates and causes a corresponding TH relay to operate.

Further when the accounting equipment at the central exchange initiates the operation of the identifying equipment the accounting code or number represented by the selected accounting ID relay such as 111 or 112 will be encoded by the common encoder 124 and then transmitted by the sender 25 over the conductors 17–0 to the central office and the accounting equipment thereat. In this manner the code or number identifying the calling station or line is changed to a code identifying the call, or type of call or to a code for assessing the charges for the call.

Upon the termination of the call the B relay 212 is released in the manner described above with the result that the contacts 231 close and complete an obvious circuit for the operation of the release magnet 229. As a result this selector switch is restored to normal and its brush arms 239 returned to their idle position. The other relays of the auxiliary circuit in accordance with the exemplary embodiment of my invention described herein release and restore the circuit to its normal or idle condition in a manner described above.

While only the one auxiliary trunk circuit 201 has been described in detail, similar trunk circuits may be provided for other trunks to the central office such as 202. Each of these auxiliary circuits comprises a stepping switch similar to the switch 225 and will cause a selected one of the accounting ID relays to operate instead of the one identifying the called subscriber's line. If desired, such additional ID relays may identify the PBX directory number or any other suitable number other than the dialing subscriber's directory number. If it is desired to charge the call to the subscriber's directory number, then no additional digit will be dialed as described above.

If it is desired to provide this additional service for only selected ones of the PBX subscribers' stations, then these selected ones of the PBX subscribers' stations will have their lines connected to line finders-selector combinations in which the trunks from the central office level extend through auxiliary line circuits in accordance with my invention. For the PBX stations not provided with such improved service the PBX subscribers' station lines will then terminate on other line finders, the line finders-selector combination not having auxiliary line circuits connected to the corresponding levels.

Any number of PBX's may be provided with this additional service by providing the auxiliary line circuit for each of the trunks to the central office over which it is desired to extend this improved service.

It is to be understood that the above-described arrangements are illustrative of the application of the principles of my invention. Numerous other arrangements may be devised by those skilled in the art without departing from the spirit and scope of the invention.

What is claimed is:

1. In a telephone system, a first switching office, a second switching office, trunks extending between said offices, a calling station, means at said first office responsive to said calling station for seizing a trunk to said second office, means at said first office for transmitting to said second office an identification of said calling station, means for delaying seizure of said trunk, means responsive to said calling station during the delay for registering a charging code distinct from said identification, and means for transmitting to said second office said charging code in place of said identification.

2. In combination in a telephone switching system a calling station, a plurality of trunks, means responsive to said calling station for seizing one of said trunks, means for generating a code identification normally associated with said calling station, means responsive to said calling station for registering a different identification code distinct from said normal identification code, and means for subsequently obtaining said different code in place of said normal code if a different code has been registered by said calling station.

3. In combination in a communication switching system, a calling station, means for automatically registering a code identification for normally assessing charges for calls from said station, and means controlled by said calling station for selectively registering other identification codes in place of said normal identification code.

4. In combination in a telephone switching system, a calling station, a call signal transmitting device at said calling station for transmitting calling signals, means for automatically registering a code identification normally associated with said calling station, means for receiving calling signals from said calling station designating other identification codes, and means responsive to said receiving means for registering said other identification codes.

5. A telephone switching system in accordance with claim 4 further comprising timing means for designating a predetermined time for transmitting said calling signals designating said other identification codes.

6. In a communication system, a first switching system, a second switching system, a calling station connected to said first switching system, a communication path extending from said first switching system to said second switching system, means for registering a normal code identification for said calling station, means responsive to signals from said calling station for selectively registering other code identifications, and means for transmitting said registered other code identification to said second office in place of said normal code identification.

7. In a telephone switching system, a calling station, a plurality of trunks, means for registering a normal code identification of said calling station, an auxiliary trunk circuit, said auxiliary trunk circuit including timer means for delaying seizure of a trunk circuit by said calling station and means for receiving calling signals from said calling station selectively designating other identification codes, and means responsive to said receiving means for registering said received other identification code, whereby said other identification code can be subsequently obtained in place of said normal identification code.

References Cited

UNITED STATES PATENTS

| | | | |
|---|---|---|---|
| 2,672,515 | 3/1954 | Barlow | 179—7 |
| 3,073,905 | 1/1963 | Herbig et al. | 179—17.1 |
| 3,087,019 | 4/1963 | Faulkner | 179—1 |

KATHLEEN H. CLAFFY, *Primary Examiner.*

H. ZELLER, *Assistant Examiner.*